May 24, 1966  W. STELZER  3,252,740
BRAKE PRESSURE PROPORTIONING DEVICE
Filed Jan. 30, 1964  3 Sheets-Sheet 1

INVENTOR.
William Stelzer.
BY
Carness, Dickey & Pierce
ATTORNEYS.

May 24, 1966 W. STELZER 3,252,740
BRAKE PRESSURE PROPORTIONING DEVICE
Filed Jan. 30, 1964 3 Sheets-Sheet 2

INVENTOR.
William Stelzer.
BY
Carness, Dickey & Pierce
ATTORNEYS.

May 24, 1966 W. STELZER 3,252,740
BRAKE PRESSURE PROPORTIONING DEVICE
Filed Jan. 30, 1964 3 Sheets-Sheet 3
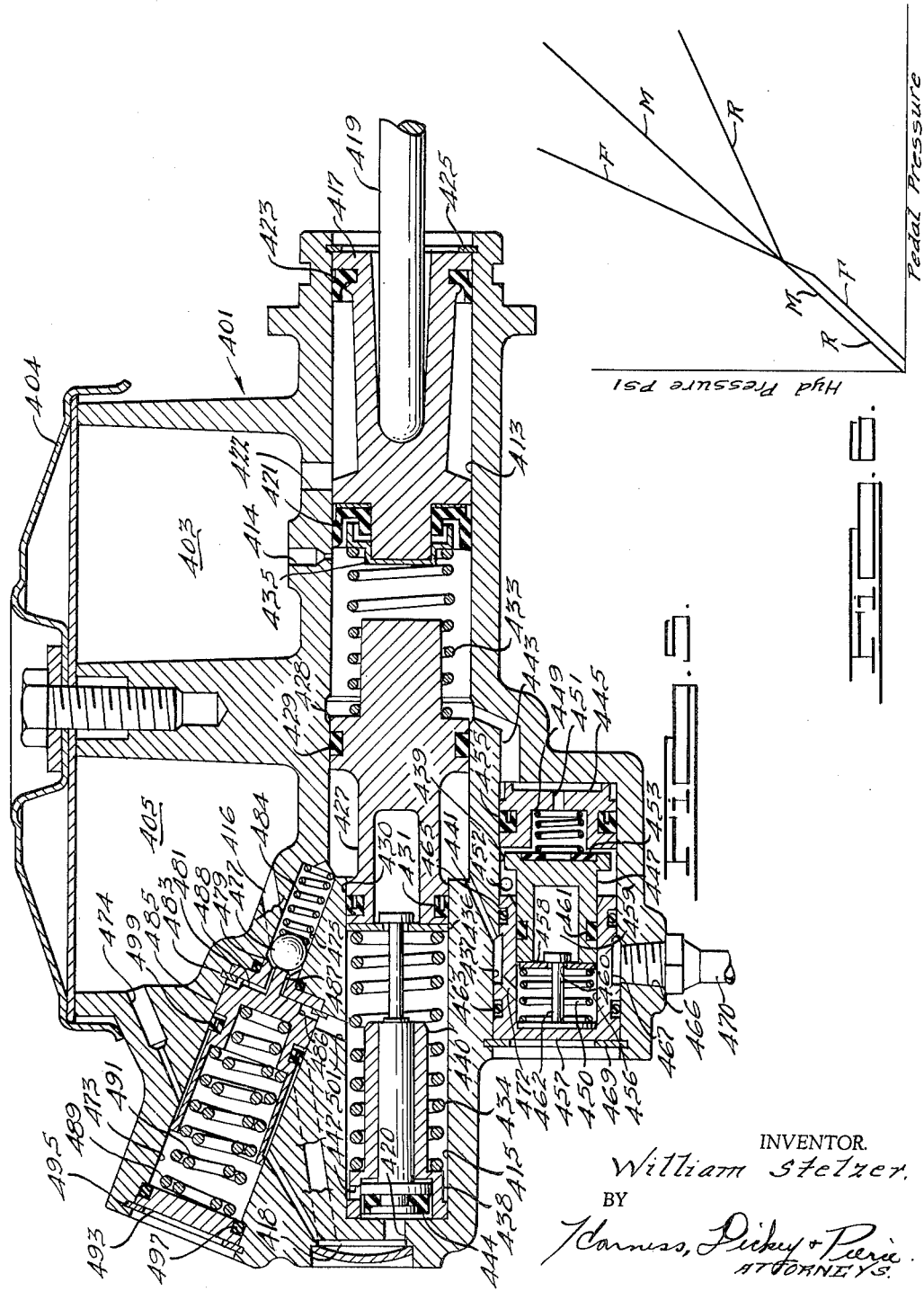
INVENTOR.
William Stelzer.
BY
Carness, Dickey & Pierce
ATTORNEYS.

United States Patent Office 3,252,740
Patented May 24, 1966

---

3,252,740
BRAKE PRESSURE PROPORTIONING DEVICE
William Stelzer, Bloomfield Hills, Mich., assignor to Kelsey-Hayes Company, Romulus, Mich., a corporation of Delaware
Filed Jan. 30, 1964, Ser. No. 341,308
13 Claims. (Cl. 303—6)

This invention relates to hydraulic brake systems for vehicles. Particularly, this invention relates to a device which will decrease the rear wheel brake cylinder pressure and increase the front wheel brake cylinder pressure during rapid vehicle deceleration to compensate for the weight transfer produced by the rapid deceleration of the vehicle.

It is well known that the braking effect of which a wheel is capable depends upon the weight carried by that wheel. In the conventional front engine automotive vehicle, the front wheels bear considerably more weight than the rear wheels. It is, therefore, customary in this type of automotive vehicle to provide brake cylinders on the front wheels of a greater size than the brake cylinders on the rear wheels, the relative sizes being proportionate to the weight borne by these wheels. Therefore, when brake fluid is supplied under pressure from a common master cylinder to the front and rear wheel brake cylinders, a greater braking effect will be realized at the front wheels than is realized at the rear wheels.

While the foregoing brake cylinder size variation yields satisfactory results for static weight distribution of the vehicle, a problem does arise when the vehicle is rapidly decelerated inasmuch as the weight distribution under such conditions will vary considerably from the static conditions. When a vehicle is decelerated, a portion of the weight which is borne by the rear wheels under static conditions shifts to the front wheels. The greater the rate of deceleration, the greater will be the amount of weight transferred. Without some sort of control for effecting a corresponding reapportionment of the braking forces, the rear wheels will skid substantially prior to the point at which the front wheels begin to skid. This condition has a number of undesirable consequences. It produces excessive wear on the lining of the front brakes and requires the application of greater pedal effort to bring the vehicle to a halt. Possibly the most serious disadvantage is that the loss of the frictional coefficient between the rear wheels and the road causes the rear wheels to attempt to overrun the front wheels with resulting sidewise skidding or "fishtailing" of the vehicle.

A further problem results from vehicles using disc-type brakes on the front wheels and drum-type brakes on the rear wheels. Certain prior art pressure proportioning devices have functioned to control the relative volume of fluid displaced to front and rear once a given rate of deceleration is reached. However, drum and disc brakes have entirely different volume requirements and fade characteristics. Accordingly, devices relying solely on the displacement of fluid at a given volume ratio are ineffective in such a vehicle.

A still further problem created by the use of drum and disc-type brakes for the different wheels of a vehicle results from the necessary use of strong return springs in the drum-type brakes. Thus, an initial hydraulic pressure is needed to overcome the force of the return springs before the drum-type brakes will have a braking effect. This is contrasted with the disc-type brakes which use either no return springs or very light return springs and a braking effect is realized almost instantaneously with the transmission of hydraulic pressure.

One proposed solution to the above problem was merely to decrease the ratio of rear wheel brake pressure to master cylinder pressure when the vehicle was undergoing rapid deceleration. This did not prove to be entirely satisfactory, however, since it resulted in the need for greater pedal effort on the part of the driver to bring the vehicle to a stop.

The device of the present invention compensates for dynamic weight transfer by reducing the ratio of rear wheel brake pressure to master cylinder pressure while increasing the ratio of front wheel brake pressure to master cylinder pressure thereby preventing any loss in the total pressures produced at the brake cylinders. A modification of the device of the present invention also provides for initial actuation of the rear wheel brake cylinders to overcome the force of the return springs before actuation of the front wheel disc brakes.

The principal object of the present invention, therefore, is to provide a weight compensating device in a hydraulic brake system for an automotive vehicle which will reproportion the relative pressurization of the front and rear wheel brake cylinders to produce front and rear wheel effects bearing a relatively accurate relationship to relative weight borne by such wheels during rapid deceleration.

A further object of the present invention is to provide a weight compensating device in an automotive hydraulic brake system which is effective to reduce the ratio of rear wheel brake cylinder pressure to the master cylinder pressure and increase the ratio of front wheel brake cylinder pressure to master cylinder pressure during rapid deceleration of the vehicle, without increasing the pedal effort needed to produce a given total braking effect.

A further object of the present invention is to provide a weight compensating device in an automotive hydraulic brake system which is effective to accomplish the transition from normal to reduced pressurization of the rear wheel cylinders relative to the master cylinder pressure in a smooth uninterrupted manner.

A further object of the present invention is to provide a weight compensating device in a vehicle hydraulic brake system which is effective to prevent premature rear wheel skidding during deceleration of the vehicle while at the same time permitting maximum utilization of both the front and rear wheel brakes during both normal and rapid deceleration.

A further object of the present invention resides in the provision of a weight compensating device for an automotive hydraulic brake system having means to prevent the premature actuation thereof.

A further object of the present invention is to provide a weight compensating device in an automotive hydraulic brake system which serves to increase the ratio of front wheel brake cylinder pressure to the master cylinder pressure while using this increased pressure to oppose pressurization of the rear wheel brake cylinders.

A further object of the present invention is to provide a weight compensating device of the above character which further acts to supply a predetermined initial pressure to one set of brake cylinders before pressurizing the other set of brake cylinders.

A further object of the present invention is to provide a weight compensating device of the above character which may be incorporated directly in the master cylinder assembly.

A further object of the present invention is to provide a weight compensating device for an automotive hydraulic brake system which is relatively inexpensive to manufacture, reliable in operation and efficient in use.

Further objects and advantages of the present invention will become more apparent from the following detailed description, taken in conjunction with the appended claims, in which:

FIG. 5 is a sectional view of the master cylinder and weight compensating device of FIG. 4; and FIG. 6 is a graph showing the master cylinder pressure, the front wheel cylinder pressure, and the rear wheel cylinder pressure, as a function of the pedal pressure, for the device of FIGURES 4 and 5.

Figure 1:
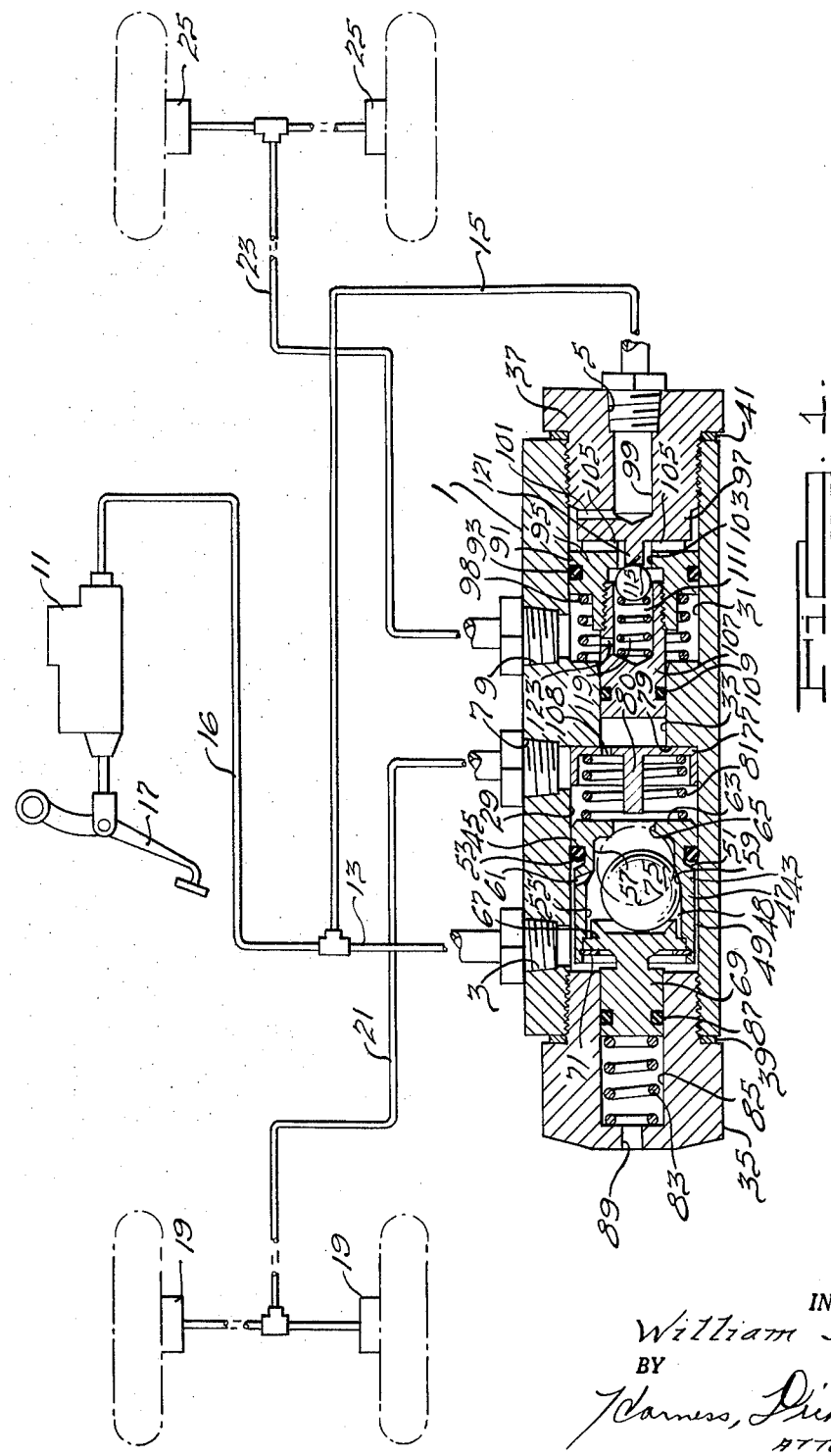
FIGURE 1 is a longitudinal sectional view of a device embodying the principles of the present invention, the device being shown in association with a diagrammatically illustrated automotive brake system.

Referring now to the drawings, and especially FIG. 1, a housing 1 is shown as being provided with an inlet opening 3 and a pair of outlet openings 7 and 9. A second inlet opening 5 is formed in a plug 37 threadedly received in the housing 1. The inlet openings 3 and 5 are connected to a pair of conduits 13 and 15, respectively, communicating with the outlet of a conventional brake master cylinder 11 through a common supply conduit 16. A brake pedal 17 operates the master cylinder 11 in the usual manner. The housing outlet opening 7 is connected to a pair of rear wheel brake cylinders 19 by a conduit 21 while the outlet opening 9 is connected through a conduit 23 to a pair of front wheel brake cylinders 25.

The housing 1 is formed with coaxial communicating bores of stepped diameter, including large diameter bores 29 and 31 at each end of the housing 1, respectively, and a smaller diameter bore therebetween. The end of the housing 1 adjacent the bore 29 is closed by a plug 35 while a plug 37 closes the end of the housing 1 adjacent the bore 31. A pair of seals 39 and 41 are interposed in fluid-tight engagement between the housing 1 and the plugs 35 and 37, respectively.

A hollow piston 43 of stepped outer diameter is disposed for sliding movement within the bore 29 and has a large outer diameter portion 45 closely engaging the wall of the bore 29. A smaller outer diameter portion 47 of the piston 43 forms between itself and the bore 29 an annular passage 49 in communication with the inlet opening 3. The piston 43 is formed with an annular generally V-shaped circumferential groove 51 carrying a conventional O-ring 53 in fluid-tight engagement with the bore 29 to prevent the passage of fluid thereby. The left-hand end of the groove 51 provides clearance between itself and the O-ring 53 for a purpose to be hereinafter described.

The piston 43 is formed with an internal chamber 48 defined by a large diameter bore wall 55 and a small diameter bore wall 57 with an annular conical ramp surface 59 disposed therebetween. A generally radially extending opening 61 connects the annular passage 49 with the chamber 48 while a radially inwardly extending annular flange 63 at one end of the piston 43 forms a second opening 65 providing communication between the chamber 48 and the outlet opening 7. The other end of the chamber 48 is closed by an extension 67 of a piston 69 secured to the piston 43 by a snap-ring 71. A valve element in the form of a ball 75 is disposed within the chamber 48 and is adapted to sealingly engage the edge of the opening 65 to prevent the passage of fluid therethrough. As will be more fully discussed herein, the conical angle of the ramp surface 59 will determine the particular rate of deceleration of the vehicle at which the ball 75 will ride up the ramp surface 59 and close the opening 65.

A valve trip device 77 is disposed within the bore 29 in abutment with a radially extending housing shoulder 79 at the right hand of the bore 29. The trip device 77 has an extension 80 adapted to unseat the ball 75 should it be moved against the opening 65 prematurely in a manner to be described. A relatively light compression spring 81 is seated at one end against the valve trip 77 and at its other end against the flange 63 of the piston 43. A relatively strong compression spring 83, disposed within a bore 85 of the plug 35, engages the piston 69 and counteracts the spring 81. Thus, the piston 43 is freely mounted in the bore 29 for movement in either direction when subjected to a corresponding pressure differential at its ends. The piston 69 has an O-ring 87 disposed circumferentially thereof in fluid-tight engagement with a bore 85. As may be seen in FIG. 1, the bore 85 is vented to the atmosphere by a vent opening 89 thus eliminating any pressure pocket which might tend to restrict reciprocation of the piston 69 within the bore 85.

When the brakes are initially or lightly applied and the vehicle is being decelerated at a rate less than that necessary to cause the ball 75 to ride up the conical ramp 59, hydraulic fluid will pass from the master cylinder through the line 13, into the inlet opening 3 and the annular passage 49, through the openings 61 and 65, and thence to the rear wheel cylinders 19 by way of the outlet opening 7 and the line 21. During this initial or light braking, the piston 43 will be moved by fluid pressure slightly in a left-hand direction to compress the spring 83. This is because of the relatively larger right-hand face areas of the piston 43 as compared with the left-hand face areas thereof exposed to the brake fluid. When the initial braking force is increased sufficiently to produce a predetermined rate of deceleration of the vehicle, the ball 75 will ride up the conical ramp 59 and block the opening 65, thereby preventing the flow of additional hydraulic fluid through the outlet opening 7. Under such conditions, further pressurization of the rear wheel cylinders can only be accomplished by movement of the piston 43 in a right-hand direction toward the outlet opening 7. However, the piston 43 possesses an effective area exposed to the motivating force of fluid from the master cylinder 11 which is less than its effective area acting against and pressurizing fluid at the outlet opening 7. When a pressure transmission piston is subject to the pressure of a motivating fluid medium on one side thereof and the reactive pressure of a fluid medium being pressurized on the other side thereof, the reactive pressure generated will bear a relationship to the pressure of the motivating fluid equal to the inverse ratio of the effective piston areas exposed to said fluid mediums. The effective area of the piston assembly 43-49 exposed to master cylinder pressure equals the cross section area of the bore 29 less the cross sectional area of the bore 85. The effective area of said piston assembly pressurizing fluid to the rear brakes equals the entire cross sectional area of the bore 29. Accordingly, the ratio of the pressure generated at the rear brake cylinders 19 to the pressure at the inlet opening 3 is reduced by the piston assembly 43-69.

Because of the fact that the fluid pressures on the opposite sides of the piston 43 are equal when the ball 75 closes the opening 65, a substantial delay in the movement of the piston to the right would be encountered to permit master cylinder pressure to build up to a sufficiently high level to overcome the differential piston areas if master cylinder pressure were the only force biasing the piston assembly 43–69 to the right. However, the spring 83 assists master cylinder pressure in pressurizing fluid at the rear brake cylinders 19, but in gradually decreasing amounts as it pays out. In addition, the O-ring 53, and the generally V-shaped groove 51 in which the O-ring is mounted, provide an offsetting action to what would otherwise be a period in which output pressure to the rear brakes would remain static. The clearance space between the O-ring 53 and the left-hand portion of the V-groove 51 permits inlet fluid pressure to act against the O-ring tending to displace it in a right-hand direction within its groove 51 and pressurize the fluid to the outlet opening 7. After the O-ring 53 has moved as much as possible within its groove 51 and after the spring 83 has payed out, the relative effective areas of the piston will control the ratio of rear wheel brake pressure to master cylinder pressure, but the O-ring 53 and the spring 83 provide a gradual stepless transition between this ratio and the 1–1 ratio prevailing during initial brake application.

Simultaneous with the reduction in the ratio of pressurization of the rear wheel cylinders relative to the master cylinder pressure there also occurs an increase in the ratio of the pressurization of the front wheel cylinders relative to the master cylinder pressure. This results from structure including a hollow piston 91 operatively disposed in the bore 31 and having an O-ring 93 extending circumferentially thereof in fluid-tight engagement with the wall of the bore 31. The piston 91 has a large diameter portion 95 at one end thereof normally biased into engagement with a neck portion 97 of the plug 37 by a light return spring 98. The plug 37 has an axially extending passage 99 which connects the inlet opening 5 with a radial passage 101 also formed in the plug 37. The passage 101 is open to the right-hand end of the bore 31. The piston 91 has a central opening 103 in communication with a plurality of radial recesses 105 formed in the end of the large diameter portion 95 adjacent the plug 37. Thus, hydraulic fluid supplied from the master cylinder 11 to the inlet opening 5 through the conduit 15 will pass through the passages 99, 101 and 105 and into the opening 103 of the piston 91.

The piston 91 has a small diameter portion 107 which is slidably and sealingly received within the bore 33. The piston portions 107 and 95 are preferably formed separately and then threadably united to function as one integral member. A plurality of openings 108 formed in the valve trip device 77 permits fluid communication between the bores 29 and 33. An O-ring 109 is carried by the piston 107 in fluid-tight relationship with the wall of the bore 33. The piston portion 107 is formed with a central bore which together with hollow interior of the piston portion 95 defines a chamber 111 in communication with the opening 103. A valve element, in the form of a ball 115, is disposed within the chamber 111 and is biased toward the opening 103 by a compression spring 119. The ball is normally held away from the opening 103 by an extension 121 of the plug 37 when the piston 91 is in engagement with the reduced diameter portion 97 of the plug 37. However, upon movement of the piston 91 in a left-hand direction against the spring 98, the ball 115 will be forced by the spring 119 into a position closing the chamber 103 and thus preventing any further flow of hydraulic fluid to the chamber 111 from the inlet 5. A radial passage 123 in the piston 107 connects the chamber 111 to the outlet opening 9. During initial or light breaking and prior to closing movement of the ball 115, hydraulic fluid will be forced from the master cylinder 11 through the conduit 15 and to the opening 103 in the piston 91, as described hereinabove. Under these conditions, the fluid pressures in the system are equal and the effective areas of the piston portions 95 and 107 exposed to these pressures are equal. Therefore, the return spring 98 is effective to maintain the piston 91 in abutment with the plug 37. Hydraulic fluid will, therefore, pass through the opening 103, past the ball valve 115, into the chamber 111, out the passage 123 and thence to the front wheel cylinders 25 by way of the outlet opening 9 and the conduit 23. However, after the ball valve 75 carried in the piston 43 has closed, as previously described, a further increase in master cylinder pressure will not produce the same incease in pressure of the fluid within the bore 33 acting against the piston portion 107. Specifically, the pressure in the bore 33 is reduced with respect to master cylinder pressure. Stated another way, the pressure in bore 33 will increase at a rate less than master cylinder pressure. As a result, fluid pressure from the master cylinder in the right-hand end of the bore 31 becomes effective to overpower the return spring 98 and move the piston 91 in a left-hand direction, thereby permitting the ball valve 115 to seat against and block the opening 103. At this point, all direct fluid communication from the master cylinder 11 to the front and rear brake cylinders is blocked off as both the valves 75 and 115 are closed. Therefore, any further pressurization of the master cylinder 11 can only be accompanied by rightward movement of the piston 43 and leftward movement of the piston 91, as described above.

As the piston 91 moves in a left-hand direction, the ratio of front wheel brake pressure to the master cylinder pressure is increased. It is apparent that the area of the piston 91 against which fluid from the master cylinder acts is equal to the area of the piston portion 95 against which front wheel brake pressure reacts plus the area of the piston portion 107 against which rear wheel brake pressure reacts. The forces, of course, equal these pressures multiplied by the areas against which the fluid pressure is applied. Assume that master cylinder pressure equals $P_M$, front wheel brake pressure equals $P_F$, rear wheel brake pressure equals $P_R$, the cross sectional area of the bore 31 is A and the cross section area of the bore 33 is B. Therefore, disregarding the relatively light force of the return spring 98, the following formula will describe the relationship of the forces:

$$P_M A = P_F(A-B) + P_R B$$

If $P_R$ is decreased, $P_F$ must be increased to satisfy the equation. Accordingly, the reduction in rear brake pressure effected by the piston 43 will control the magnitude of the increase in front wheel pressure created by the piston 91.

It should be noted that as the piston portion 107 moves to the left and the piston 43 moves to the right, the piston portion 107 acts to assist the piston 43 in displacing fluid to the rear brake cylinders 19. For this reason the area $(A-B)$ must be sufficiently large and the area B sufficiently small that the movement of the piston 91 to the left in response to master cylinder pressure does not create an artificially high pressure in the right-hand end of the bore 29 (and thus in the rear brakes) and destroy the ability of the piston 43 to control the ratio of rear wheel brake pressure to master cylinder pressure. The operable range of relative sizes depends upon the relative capacities of said brake cylinders, but in brake systems where the front cylinders have greater capacities than the rear brake cylinder or where they are nearly equal, then $(A-B)$ should be greater than B. In the illustrated embodiment, this is true, by a ratio of over 2½ to 1.

To insure that the valve ball 75 is not closed prematurely, the extension 80 of the valve trip device is provided. Thus, if the ball 75 should prematurely seat against the opening 65, as by the vehicle traveling downhill, and if this should be followed by application of the brake pedal 17, a relatively small amount of hydraulic fluid will have passed to the rear wheel cylinders 19 as compared to the large amount which passes when the vehicle is undergoing rapid deceleration due to pressurization of the master cylinder. The piston 43 will, therefore, be free for sufficient travel in a right-hand direction to cause the extension 80 to engage the ball 75 and unseat it. Hydraulic fluid can then pass through the opening 65 thereby releasing the pressure tending to move the piston 43 in a right-hand direction. This hydraulic fluid will also insure that the piston 43 returns to its rest position by acting against the right-hand face of the piston flange 63 until such time that the rate of deceleration is at the magnitude established to cause the ball 75 to ride up the conical ramp 59. Thus, the ball valve 75 will be prevented from seating against the opening 65 until a sufficient amount of hydraulic fluid has been displaced to the rear wheel cylinders 19.

From the foregoing, it will be apparent that after an initial braking effort, the bypass means provided by the openings 65 and 103 will close to cause the front and rear brakes to be pressurized at levels having a known ratio. This is done by two separate pistons and does not require an accurate forecast of the exact volume of fluid which each set of brake cylinders will require to establish a desired pressure. Accordingly, a device embodying the present invention may be used in a variety of different brake systems and is not subject to malfunction as a result of unexpected changes in the quantity of fluid used by a brake cylinder to produce a desired pressure resulting from drum expansion or the like.

Figure 2:
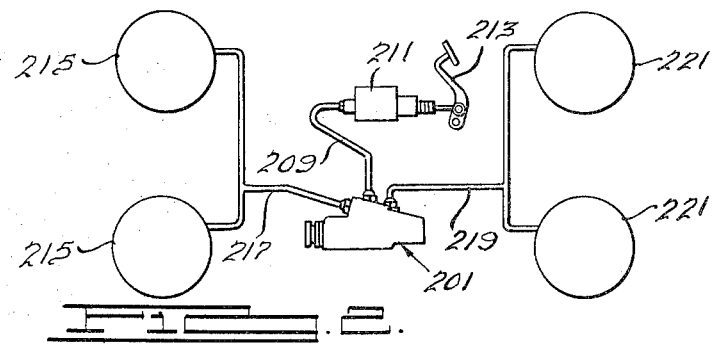
FIG. 2 is a diagrammatic view of an automotive brake system including a modified form of the weight compensating device.
Figure 3:
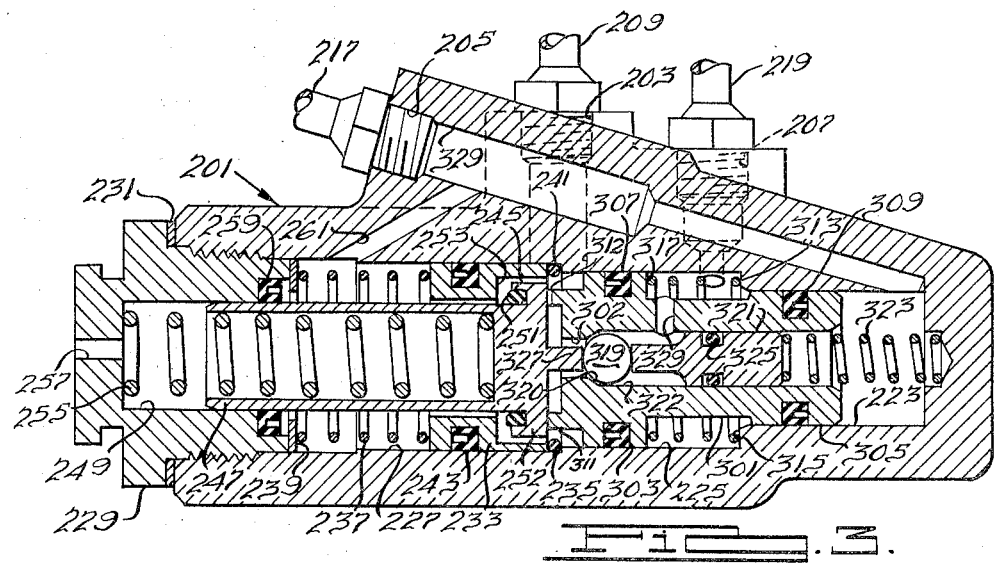
FIG. 3 is a sectional view of the weight compensating device of FIG. 2.

A modified form of brake pressure proportioning device is shown in FIGURES 2 and 3 and is seen to include a housing 201 having an inlet opening 203 and a pair of outlet openings 205 and 207. The inlet opening 203 is connected to a conduit 209 which communicates with the output of a conventional master cylinder 211 operated by a brake pedal 213 in the usual manner. The housing outlet opening 205 is connected to a pair of front wheel brake cylinder assemblies 215 by a conduit 217 while the housing outlet opening 207 is connected through a conduit 219 to a pair of rear wheel brake cylinder assemblies 221.

The housing 201 is formed with a plurality of axially communicating bores of stepped or varying diameter which includes a small diameter bore 223, an intermediate bore 225, and a large diameter bore 227. Each of the bores may be machined from the left-hand end thereof, which is open as the housing 201 is formed, and which end may be closed by a plug member 229. A seal 231 is disposed in fluid-tight engagement between the housing 201 and the plug 229. A hollow piston 301, having an opening 302 at one end thereof, is provided with a first portion 303 slidably disposed within the bore 225 and a second portion 305 slidably disposed within the bore 223. Appropriate seals 307 and 309 are carried by the portions 303 and 305, respectively, and sealingly engage the wall of the bores 225 and 223. The left-hand end of the piston 301 is provided with an annular extension 311 having at least one radial notch 312 therein and adapted to engage the right-hand face of a valve member 245, to be described. A relatively light return compression spring 313 has one end thereof in engagement with a shoulder 315 formed between the bores 223 and 225 while the other end engages a shoulder 317 on the piston 301 formed by the portion 303. A valve element in the form of a ball 319 is positioned within the hollow piston 301 and is adapted to sealingly engage a valve seat 320 adjacent the opening 302 to prevent the flow of fluid through the opening 302 and into a bore 322 also formed in the piston 301. A plunger or piston 321 is positioned within the bore 322 and is normally spring biased toward the ball 319 by a compression spring 323. A conventional seal 325 is disposed between the bore 322 and the piston 301 to prevent the flow of fluid thereby. A valve trip device in the form of an extension 327 formed on the valve member 245 is positioned to engage the ball 319 and unseat it from the valve seat 320 when the device is in the released position shown in FIGURE 3. A generally radially extending opening 329 communicates the bore 322 with the housing outlet opening 207. Thus, during initial or light braking, hydraulic fluid is forced from the master cylinder 211 into the housing opening 203, through the opening 302 and bore 322 of the piston 301, through the opening 329 and thence to the rear wheel cylinders 221 by way of the housing outlet 207 and the conduit 219. When the applied braking pressure from the master cylinder is increased to a predetermined level, it will apply a sufficient force to the valve member 245 to move it in a left-hand direction (in a manner to be described) thereby moving the valve trip 327 away from the ball 319. The piston 321 will then move the ball 319 in a left-hand direction against the valve seat 320 thereby preventing further direct flow of hydraulic fluid to the rear wheel cylinders 221 from the master cylinder 211. Thereafter, pressurization of the rear wheel cylinders can only be accomplished by movement of the piston 301 in a right-hand direction.

A second hollow or annular piston 233 is disposed for sliding movement within the bore 227 and the right-hand portion thereof is normally maintained adjacent a shoulder 235 formed between the intermediate bore 225 and the large bore 227 by one end of a relatively light compression spring 237, the other end of which engages a ring 239 adjacent the plug 229. A stop member 241 may be positioned adjacent the shoulder 235 to cushion the right-hand movement of the annular piston 233 while a conventional annular seal 243 is disposed circumferentially on the piston 233 and in sealing engagement with the wall of the bore 227.

Positioned for free sliding movement within the annular piston 233 is the valve member 245 which has a tubular or sleeve-like extension 247 of reduced diameter slidably received within a bore 249 formed in the plug 229. A conventional O-ring 251 is positioned on the valve member 245 adjacent a head portion 252 thereof and is adapted to sealingly engage a shoulder 253 on the piston 233 when the valve member 245 is moved in a left-hand direction relative to the piston 233. When the parts are in the released position, hydraulic fluid can pass between the piston 233 and the valve member 245 around the valve head and through an annular space between the tubular extension 247 and the inner periphery of the piston 233.

A relatively strong compression spring 255 of known strength has one end thereof positioned for engagement with the plug 229 while the other end extends within the hollow extension 247 of the valve member 245 and abuts against the end thereof to resist movement by the valve member 245 in a left-hand direction. The bore 249 is vented to the atmosphere by means of a vent opening 257, thus eliminating any pressure pocket which might tend to restrict reciprocation of the extension 247 within the bore 249, while a conventional seal 259 may be carried by the plug 229 and sealingly engages the extension 247 to prevent the flow of fluid thereby. Thus, during initial or light braking, hydraulic fluid will be forced from the master cylinder 211, through the conduit 209 and the inlet opening 203, between the piston 233 and valve member 245, into the chamber formed between the bore 227 and the extension 247, out an opening 261 in the housing 201 connected to the outlet 205, and thence to the front wheel cylinder assemblies 215 through the conduit 217. The spring 255 is designed to prevent movement of the valve member 245 in a left-hand direction during such initial or light braking. When the initial braking force is increased sufficiently to produce a predetermined hydraulic pressure within the housing 201, the pressures tending to move the valve member 245 in a left-hand direction will overcome the forces tending to move the valve member 245 in a right-hand direction whereupon the valve member 245 will move in a left-hand direction relative to the piston 233 bringing the O-ring 251 into sealing engagement with the shoulder 253. Under such conditions, the by-pass opening provided by the hollow center of the piston 233 is closed and there no longer exists a direct fluid path from the master cylinder 211 to the rear brake cylinder 215.

The operation of the device of FIGS. 2 and 3 will now be described. As set forth hereinabove, during initial or light braking, hydraulic fluid will enter the housing 201 through the opening 203 and will pass between the piston 233 and the valve member 245 and to the front wheel cylinders 215. At the same time, hydraulic fluid will pass through the opening 302 to the bore 322 of the piston 301 and thence to the rear wheel cylinders 221. Under these conditions, the pressures throughout the system are equal and no movement of any of the elements in the housing takes place. When the initial braking force is increased a predetermined amount, the hydraulic pressure within the housing will increase a corresponding predetermined amount thereby causing movement of the valve member 245 in a left-hand direction. The increasing master cylinder pressure acts against the valve member 245 over an effective area equal to the cross sectional area of its sleeve-shaped extension 247. The fluid pressure acting on this area is, of course, opposed by the spring 255.

By proper design of the spring 255, the valve member 245 can be caused to close at nearly any desired master cylinder pressure. This pressure is selected to correspond with a rate of deceleration at which it is desirable to bring the weight transfer compensating means into play.

At the same time that the valve member 245 moves in a left-hand direction, the ball 319 will close against the valve seat 320. Thus, no further hydraulic fluid will be permitted to flow directly to either the front or rear wheel cylinders and further pressurization of either the front or rear wheel brake cylinders can only take place by movement of the pistons 233 and 301 in a left and a right-hand direction, respectively. At the instant of valve closure, an equal pressure condition exists on all sides of the pistons 233 and 301. However, further increases in master cylinder pressure will now produce dissimilar increases in pressure to the rear and front wheel brake cylinders. Assuming that master cylinder pressure is $P_m$, front wheel brake pressure is $P_f$, rear wheel brake pressure is $P_r$, the force of the spring 255 is $F_s$, the cross sectional area of the bore 227 is A, the cross sectional area of the piston extension 247 is B, the cross sectional area of the bore 225 is C, and the cross sectional area of the bore 223 is D, the following formulas will describe the relationship of the forces:

$$P_m A = P_f(A-B) + F_s$$
$$P_m C = P_f D + P_r(C-D)$$

Therefore:

$$P_f = \frac{P_m A - F_s}{A-B} \text{ and } \frac{P_r = P_m C - P_f D}{C-D}$$

Thus, an increase in $P_m$ must result in a corresponding increase in $P_f$. However, this will result in a lesser increase in $P_r$ since the increase in $P_f$ increases the resistance to right-hand movement of the piston 301. Therefore, a further increase in the master cylinder pressure increases the ratio of the front wheel cylinder pressure to the master cylinder pressure while decreasing the ratio of the rear wheel pressure to the master cylinder pressure by an amount regulated by the front wheel cylinder pressure.

Figure 4:
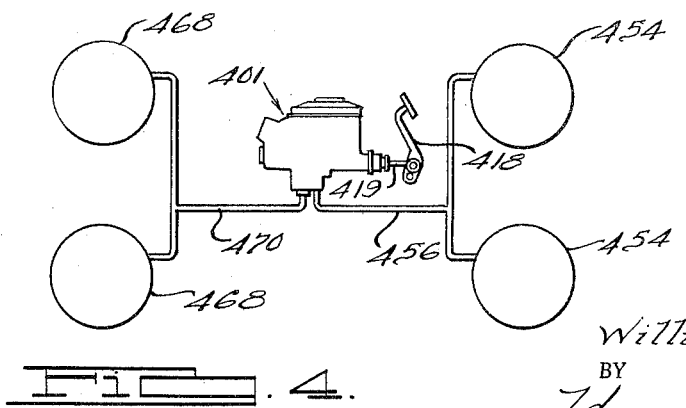
FIG. 4 is a diagrammatic view of an automotive brake system incorporating another modified form of the invention in which the weight compensating device is incorporated directly in the master cylinder.

A form of the invention which may be incorporated directly in the master cylinder assembly of a vehicular braking system is shown in FIGS. 4 and 5. In this modification, a master cylinder housing 401 is seen to include first and second hydraulic fluid reservoirs 403 and 405 covered by a closure assembly 404.

The housing 401 is formed with a stepped diameter bore construction including a large diameter bore 413 and a smaller diameter adjacent coaxial bore 415. A first inlet opening 414 connects the reservoir 403 with the large diameter bore 413 while a second inlet 416 connects the reservoir 405 with the smaller diameter bore 415 through a compensating valve 418 and an opening 420. An inlet 422 communicates the reservoir 403 with the bore 413 to maintain the same at atmospheric pressure. A first piston 417, operatively connected to a conventional brake pedal 418 by a push rod 419, is slidably disposed in the large diameter bore 413. A pair of seals 421 and 423 are carried by the piston 417 and engage the wall of the bore 413. A snap ring 425 is positioned at one end of the bore 413 to prevent the piston 417 from being withdrawn out of the bore. A second piston 427 has a first flange portion 428 slidably disposed within the large bore 413 and a second flange portion 430 thereof slidable in the smaller diameter bore 415. A pair of conventional seals 429 and 431 are carried by the first and second flanged portions of piston 427 and engage the bores 413 and 415, respectively. A relatively light compression spring 433 has one end in engagement with the right-hand end of the piston 427 while the other end thereof abuts a cap 435 carried on the left-hand end of the piston 417. Opposing the action of the spring 433 on the piston 427 is a relatively strong compression spring 434 having one end in engagement with an annular plate 436 which, in turn, abuts the left-hand end of the piston 427. A radial flange 438 formed on a hollow guide member 440, which abuts the end wall of the bore 415, engages the other end of the spring 434. The flange 438 has an opening 442 formed therein to permit fluid to flow from the reservoir 405, through the openings 416 and 420, and thence to the bore 415. However, during the initial braking sequence when the piston 427 begins movement in a left-hand direction, a closure sealing member 444 will be moved into sealing engagement with the end wall of bore 415 by fluid pressure to prevent any further ingress or egress of hydraulic fluid from the reservoir 405. Thus, during initial or light braking, movement of the piston 417 in a left-hand direction through the push rod 419 will compress the spring 433 a predetermined amount before any left-hand movement of the piston 427 occurs. When the spring 433 has been compressed by said predetermined amount, it will overcome the force of spring 434 thereby causing movement of the piston 427 in a left-hand direction. Such an arrangment is provided to cause initial actuation of the rear wheel brake cylinders before any fluid pressure is exerted on the front wheel cylinders. This is desirable in the use of drum-type brakes on the rear wheels and disc-type brakes on the front wheels. Return springs are generally used on drum-type brakes and the force of these springs must first be overcome before any braking effect can be realized. On the other hand, disc brakes normally realize a braking effect immediately upon being subjected to hydraulic pressure. Here, the piston 417 may be used to displace fluid to the rear wheel drum-type brake cylinder assembly while the piston 427 displaces fluid to the front disc-type cylinder assembly. Thus, by properly designing the springs 433 and 434, a predetermined pressure will have been established in the rear wheel cylinders before pressurization of the front wheel cylinders.

A second bore of stepped diameter is formed in the housing 401 and has a large diameter bore 437 and a smaller diameter bore 439. An opening 441 communicates the large diameter bore 437 with the bore 413 to the left of the piston portion 428 while an opening 443 communicates the portion of the bore 413 between the pistons 417 and 427 with the smaller diameter bore 439. Thus, movement of the piston 417 in a left-hand direction will displace fluid to the opening 443 and the bore 439 while movement of the piston 427 in a left-hand direction will displace fluid to the opening 441 and the bore 437.

A piston 445 is disposed for sliding movement within the bore 439 and is seen to be formed with a central opening 451 to allow fluid to flow therethrough to an outlet opening 452 connected to a pair of rear wheel cylinders 454 by a conduit 456. The opening 451 is adapted to be closed by a valve member 447 which is normally biased to an open position by a coil spring 449 seated against the piston 445. A sealing member 453 is carried by the valve member 447 and this makes contact with the face of the piston 445 when the valve member 447 closes against the spring 449. A conventional seal 455 is positioned on the piston 445 and engages the small diameter bore 439 to prevent the flow of fluid thereby from the bore 413. The valve member 447 is reciprocally disposed in the bore 456 of piston 457 and is formed with a pressure chamber 459 open to the bore 456. A return spring 450 is seated within the piston bore 456 and bears against a plate 458. The plate 458, in turn, bears against the head of a pin 462 which passes freely through a central aperture 460 formed in the plate. The plate forms an abutment the left-hand end of the valve member, the abutment being yieldable by collapse of the spring 450 to permit fluid pressurizing movement of the piston 445. The free flow of fluid from within the piston bore 456 to pressure chamber 459 is provided by the clearance between the pin 462 and the aperture 460. A seal 461 carried by the valve member 447 engages the wall of the bore 456 and prevents the flow of fluid therepast, while the piston 457 carries a pair of seals 463 and 465 in fluid-tight engagement with the bores 437 and 439, respectively. The piston 457 has an annular peripheral groove 467 formed therein which communicates with the bore 456 by a passage 472 also formed in the piston 457. This provides communication between the opening 441 and an outlet opening 466 connected to the front wheel cylinders 468 by a conduit 470. The piston 457 is retained in the bore 437 by a snap ring 469. Thus, when the brakes are initially applied and the piston 417 is first moved in a left-hand direction, hydraulic fluid is displaced through the opening 443, the opening 451, between the piston 445 and valve member 447, and thence to the rear wheel cylinders 454 by way of the outlet 452 and the conduit 456. When this applied pedal pressure reaches a predetermined value, the force of the spring 433 and hydraulic pressure acting against the right-hand face of the piston 427 will overcome the spring 434 and the piston 427 will be moved in a left-hand direction. Thus, hydraulic fluid will then be forced by the piston portion 428 through the opening 441, around the annular groove 461 in the piston 457, and through the outlet 466 to the front wheel cylinders 468.

The housing 401 provides a path for the direct flow of fluid from the smaller diameter bore 415 to the large diameter bore 413, and this path is seen to include a bore 473 communicating with a co-axial passage 475. An opening 474 communicates the reservoir 405 with the bore 473 to maintain the same at atmosphere pressure. A ball valve element 477 is positioned within the passage 475 and is adapted to seat against an annular conical seat 479 of valve seat member 481 positioned at the juncture of the passage 475 and the bore 473 by a snap ring 483. A compression spring 484 biases the ball 477 toward its closed position. A piston 485 is slidably disposed in the bore 473 and is provided with an integral extension 487 extending through the valve seat member 481 with clearance space therearound. The extension 487 is operable to engage the ball 477 and unseat it from the surface 479. The piston 485 has a reduced diameter portion 486 formed adjacent the extension 487 and provided with radial passage means 488 therein. Means are provided to normally bias the piston 485 toward a valve opening position and such means are shown as including a pair of compression springs 489 and 491, each having one end in engagement with the piston 485 while the other ends thereof abut a plug 493 retained in the bore 473 by a snap ring 495. An appropriate fluid seal 497 is positioned between the plug 493 and the bore 473 while a fluid seal 499 is positioned on the piston 485 in engagement with the bore 473 to effectively prevent the flow of fluid thereby from the right-hand end of the bore 473. An opening 501 communicates the small bore 415 with the passage means 488 while the passage 475 extends into the large bore 413. Thus, during the initial portion of the left-hand movement of the piston 427, hydraulic fluid will be displaced by the flanged portion 430 of the piston 427 from within the bore 415, through the openings 501 and 488, through the opening 479, the passage 475, and thence to the front wheel cylinders by way of the opening 441, the groove 467, and the conduit 470. However, upon application of a predetermined pedal pressure which is selected to correspond with a rate of vehicle deceleration at which it is desirable to bring the weight transfer compensating means into play, the force of the hydraulic fluid applied against the right-hand face of the piston 485, which is computed by multiplying the hydraulic pressure by the cross sectional area of the piston 485, will exceed the force applied by the springs 489 and 491, whereupon the piston 485 will be moved in a left-hand direction. The spring 484 will then cause the ball valve 477 to close, thereby preventing any further passage of fluid therepast. Thereafter, the fluid trapped in the bore 415 will displace the piston 485 in a left-hand direction by acting against the right-hand face thereof as the piston 427 is moved further to the left by continued brake pedal application. Therefore, the forces opposing left-hand movement of the piston portion 430, after the ball valve 477 is closed, remain substantially constant. This is so because the springs 434, 489 and 491 are of sufficient length that the extent to which they are shortened during compression is not enough to bring an appreciable force differential into consideration. Also, the portion of the bore 473 behind the piston 485 is maintained at atmospheric pressure by the opening 474. Thus, as the applied pedal pressure increases, a corresponding increase results in the pressure applied against the right-hand face of the piston 427. Since the force resisting left-hand movement of the portion 430 of piston 427 remains constant, and since the left-hand area of the portion 428 of the piston 427 subjected to fluid pressure is less than the right-hand area of the piston 427 subjected to fluid pressure, the fluid pressure at the left-hand face of the portion 428 of the piston will increase at a more rapid rate than the pressure at the right-hand face of the piston 427. Assuming $P_m$ to be the pressure against the right-hand face of the piston 427, $P_f$ to be the pressure against the left-hand face of the portion 428 of the piston 427, $P_y$ to be the pressure in the bore 415, A to be the cross-sectional area of the bore 413, and B to be the cross-sectional area of the bore 415, the following equation describes the relationship of the forces on the piston 427 after the valve 477 has been closed:

$$P_m A = P_f(A-B) + P_y B$$

Therefore, an increase in $P_m$ must result in a greater increase in $P_f$ in order to satisfy the equation. Since the pressure in chamber 459 is equal to $P_f$, and since the pressure acting against the right-hand face of the piston 447 is equal to $P_m$, an increase in $P_f$ relative to $P_m$ will, at some point, depending on the design of the spring 449, cause the piston 447 to move against piston 445 thereby preventing the flow of any further fluid to the rear wheel cylinders. Further pressurization of the rear wheel cylinders must be by movement of the piston 445 in a left-hand direction. This movement is resisted by the increased pressure within the chamber 459, which pressure also pressurizes the front wheel cylinders. It can therefore be seen that upon closing of the valve members 447 and 477 increases in master cylinder pressure will produce even greater increases in the pressure delivered to the front wheel brake cylinders. It can further by seen that this increase in front brake pressure with respect to master cylinder pressure opposes the pressurizing source for the rear brakes (the piston 445) and thus reduces rear wheel brake pressure in a related manner.

FIG. 6 is a graphic representation of the relationship between the master cylinder pressure, the front wheel cylinder pressure, and the rear wheel cylinder pressure, as a function of the applied pedal pressure, of the device of FIGS. 4 and 5. Line M represents the master cylinder pressure which increases in a direct proportional relation as the applied pedal pressure increases. Line F represents the hydraulic pressurization of the front wheel cylinders and line R represents the hydraulic pressurization of the rear wheel cylinders. Thus, as illustrated in FIG. 6, the front wheel brake cylinders will not initially be pressurized until a predetermined pedal pressure has been applied while the rear wheel brake cylinders undergo immediate pressurization. This is so in order to permit the return springs in the drum-type brakes conventionally used on the rear wheels to be overcome before pressurization of the front wheel brakes, conventionally of the disc-type which realize an immediate braking effect. As the master cylinder pressure increases further, the front and rear wheel cylinder pressurization will increase proportionally until the ball valve 477 is closed as described hereinabove. A further increase in the master cylinder pressure will then be accompanied by a greatly increased pressurization of the front wheel cylinders and a greatly reduced pressurization of the rear wheel cylinders. Stated in another way, the ratio of the rear wheel brake pressure to master cylinder pressure decreases while the ratio of the front wheel brake pressure to master cylinder pressure increases thereby compensating for dynamic weight transfer existing during rapid deceleration.

While preferred embodiments of the present invention have been illustrated and described herein, it will be appreciated that various additions, substitutions, omissions and modifications may be made thereto without departing from the spirit of the invention as encompassed by the appended claims.

What is claimed is:

1. A brake pressure control device for use in the hydraulic brake system of a vehicle having first and second sets of brake cylinders, said device including a master cylinder communicated with first and second fluid displacing means operable to displace fluid separately to said first and second sets of brakes, respectively, bypass means communicating said master cylinder with said first set of brake cylinders, said bypass means being operable to close upon reaching a predetermined level of pressure at said master cylinder, means directing fluid displaced by said second fluid displacing means in opposition to the brake pressure applying movement of said first fluid displacing means, the opposing force of the fluid from said second fluid displacing means being effective to modulate the pressure delivered to said first set of brakes at master cylinder pressures greater than said predetermined level.

2. A brake pressure control device for use in a vehicle hydraulic brake system having a master cylinder and a front and a rear set of brake cylinders, a fluid chamber, first fluid displacing means in said fluid chamber for displacing fluid to one set of brake cylinders, second fluid displacing means having a portion thereof in said chamber and movable independently of said first fluid displacing means for displacing fluid to the other set of brake cylinders, said second fluid displacing means being opposed in its fluid displacing movement by the pressure of fluid displaced by said first fluid displacing means, both of said fluid displacing means being motivated by said master cylinder, a bypass for at least one of said fluid displacing means communicating said master cylinder with the set of brake cylinders to which fluid is displaced by said at least one fluid displacing means, said bypass means being operable to close upon reaching a predetermined level of pressure in said master cylinder whereby the set of brake cylinders pressurized by said second fluid displacing means will be pressurized in amounts regulated by said first fluid displacing means.

3. A brake pressure control device for use in a vehicle hydraulic brake system having a master cylinder and a front and a rear set of brake cylinders, a fluid chamber, first piston means movable in said fluid chamber for displacing fluid to one set of brake cylinders, second piston means having a portion thereof in said fluid chamber and movable independently of said first piston means for displacing fluid to the other set of brake cylinders, said second piston means being opposed in its fluid displacing movement by the pressure of fluid displaced by said first piston means, both of said piston means being arranged for motivation by master cylinder pressure, a bypass for at least one of said piston means communicating said master cylinder with the set of brake cylinders to which fluid is displaced by said at least one piston means, said bypass means being operable to close in response to inertia caused by vehicle deceleration whereby the set of brake cylinders pressurized by said second piston means will be pressurized in amounts regulated by said first piston means.

4. A brake pressure control device for use in a vehicle hydraulic brake system having a master cylinder and a front and a rear set of brake cylinders including a housing having first and second fluid pressure chambers therein, first piston means in said first fluid pressure chamber for displacing fluid to said rear set of brake cylinders, second piston means in said second fluid pressure chamber for displacing fluid to said front set of brake cylinders, means supplying master cylinder pressure to motivate said first and second piston means, a bypass for said first piston means, means for closing said bypass in response to inertia caused by vehicle deceleration, said second piston means having a portion exposed to fluid in said first chamber and being opposed in its fluid displacing movement by the pressure of the fluid displaced by said first piston means whereby said front set of brake cylinders will be pressurized in amounts regulated by said second piston means.

5. A brake pressure control device for use in a vehicle hydraulic brake system having a master cylinder and a front and a rear set of brake cylinders including a housing having first and second fluid pressure chambers therein, first piston means in said first fluid pressure chamber for displacing fluid to one set of brake cylinders, second piston means in said second fluid pressure chamber for displacing fluid to the other set of brake cylinders, means supplying master cylinder pressure to motivate said first and second piston means, a bypass for at least one of said piston means, means for closing said bypass upon attaining a predetermined master cylinder pressure, said first piston means having a portion exposed to fluid in said second chamber and being opposed in its fluid displacing movement by the pressure of the fluid displaced by said second piston means whereby the set of brake cylinders pressurized by said second piston means will be pressurized in amounts regulated by said first piston means.

6. A brake pressure control device for use in a vehicle hydraulic brake system having a master cylinder and a front and a rear set of brake cylinders including a first fluid pressure chamber having a first piston means disposed therein for displacing fluid to said rear set of brake cylinders, a second fluid pressure chamber having a second piston means disposed therein for displacing fluid to said front set of brake cylinders, said first piston means having a portion exposed to fluid in said second chamber and being opposed in its fluid displacing movement by the pressure of the fluid displaced by said second piston means, both of said piston means being disposed for motivation by master cylinder pressure, means providing a bypass for said first piston means, means biasing said bypass means toward its open position, said bypass means being subjected to the pressure of fluid displaced by said second piston whereby said bypass will be closed upon attainment of a predetermined pressure in said second fluid pressure chamber.

7. A brake pressure control device for use in a vehicle hydraulic brake system having a master cylinder and a front and a rear set of brake cylinders including a first fluid pressure chamber having a first piston means disposed therein for displacing fluid to said rear set of brake cylinders, a second fluid pressure chamber having a second piston means disposed therein, said second piston means including a first portion for displacing fluid to said front set of brake cylinders and a second portion, means including a normally open valve means for conducting fluid displaced by said second portion of said second piston adjacent said first portion, means for closing said valve means upon reaching a first predetermined level of pressure in said master cylinder, said first piston means having a portion exposed to fluid in said second chamber and being opposed in its fluid displacing movement by the pressure of the fluid displaced by said second piston means, both of said piston means being disposed for motivation by master cylinder pressure, means providing a bypass for said first piston means, and means for closing said bypass upon reaching a second predetermined level of pressure in said master cylinder greater than said first predetermined level and in response to closing of said valve means.

8. A brake pressure control device for use in a vehicle hydraulic brake system having a master cylinder and a front and a rear set of brake cylinders including a first fluid pressure chamber having a first piston means disposed therein for displacing fluid to one set of brake cylinders, a second fluid pressure chamber having a second piston means disposed therein, resilient means biasing said second piston in one direction, said second piston being movable in a direction compressing said resilient means to displace fluid to the other set of brake cylinders, means directing fluid displaced by said second piston means in opposition to brake pressure applying movement of said first piston means, a bypass for at least one of said piston means communicating said master cylinder with the set of brake cylinders to which fluid is displaced by said at least one piston means, means for closing said bypass upon attaining a first predetermined level of master cylinder pressure, both of said piston means being disposed for motivation by master cylinder pressure, said resilient means being effective to delay actuation of said second piston means until attaining a second predetermined level of master cylinder pressure greater than said first predetermined level.

9. A brake pressure control device for use in a vehicle hydraulic brake system having a master cylinder and a front and a rear set of brake cylinders including a first fluid pressure chamber having a first piston means disposed therein for displacing fluid to said rear set of brake cylinders, a second fluid pressure chamber having a second piston means disposed therein, said second piston means including a first portion for displacing fluid to said front set of brake cylinders and a second portion exposed to the pressure of the fluid displaced by said first piston means, both of said piston means being disposed for motivation by master cylinder pressure, a bypass for each of said piston means communicating said master cylinder with said front and rear brake cylinders, a first one of said bypasses being operable to close upon reaching a first predetermined level of pressure at said master cylinder, the other of said bypasses being operable to close upon reaching a second predetermined level of pressure at said master cylinder greater than said first predetermined level, whereby said rear brake cylinders will be pressurized in amounts regulated by said second piston means at master cylinder pressures greater than said first predetermined level.

10. A brake pressure control device for use in a vehicle hydraulic brake system having a master cylinder and a front and a rear set of brake cylinders including a first fluid pressure chamber having a first piston means disposed therein for displacing fluid to one set of brake cylinders, a second fluid pressure chamber having a second piston means disposed therein for displacing fluid to the other set of brake cylinders, both of said piston means being disposed for motivation by master cylinder pressure, means providing a first bypass for said second piston means, resilient means normally biasing said first bypass means toward an open position, said master cylinder pressure acting against said first bypass means in a direction to compress said resilient means, means providing a second bypass for said first piston means, means interrelated with said first bypass for maintaining said second bypass in an open position, whereby said first bypass will be closed in response to a predetermined master cylinder pressure and said second bypass will be closed in response to closing of said first bypass, said first piston means having a portion exposed to fluid in said second chamber and being opposed in its fluid displacing movement by the pressure of fluid displaced by the said second piston means, whereby the set of brake cylinders pressurized by said second piston means will be pressurized in amounts regulated by said first piston means.

11. A brake pressure control device for use in a vehicle hydraulic brake system having a master cylinder and a front and a rear set of brake cylinders including a first fluid pressure chamber having a first piston means disposed therein for displacing fluid to one set of brake cylinders, a second fluid pressure chamber having a second piston means disposed therein for displacing fluid to the other set of brake cylinders, both of said piston means being disposed for motivation by master cylinder pressure, means providing a first bypass for said second piston means, resilient means normally biasing said first bypass means toward an open position, said master cylinder pressure acting against said first bypass means in a direction to compress said resilient means, means providing a second bypass for said first piston means, means interrelated with said first bypass for maintaining said second bypass in an open position, means biasing said second bypass means toward a closed position whereby said first bypass will be closed in response to a predetermined master cylinder pressure and said second bypass will be closed in response to closing of said first bypass, said first piston means having a portion exposed to fluid in said second chamber and being opposed in its fluid displacing movement by the pressure of fluid displaced by said second piston means, whereby the set of brake cylinders pressurized by said second piston means will be pressurized in amounts regulated by said first piston means.

12. A brake pressure control device for use in a vehicle hydraulic brake system having a master cylinder and a front and a rear set of brake cylinders including a fluid chamber, first fluid displacing means having a portion thereof in said chamber and displacing fluid to one set of brake cylinders, a second fluid displacing means in said fluid chamber and displacing fluid to the other set of brake cylinders, both of said fluid displacing means being disposed for motivation by master cylinder pressure, a bypass for each of said fluid displacing means communicating said master cylinder with said front and rear set of brake cylinders, means for closing a first one of said bypasses upon reaching a first predetermined level of pressure in said master cylinder, means for closing the other said bypass in response to reaching a second level of pressure in said master cylinder greater than said first level, said first fluid displacing means being opposed in its movement by movement of said second fluid displacing means in said fluid chamber, whereby the set of brake cylinders pressurized by said second fluid displacing means will be pressurized in amounts regulated by said first fluid displacing means at master cylinder pressures greater than said second level.

13. A brake pressure control device for use in a hydraulic brake system of a vehicle having first and second sets of brake cylinders, said device including a master cylinder communicated with first and second fluid displacing means operable to displace fluid separately to said first and second sets of brakes, respectively, first bypass means communicating said master cylinder with said first set of brake cylinders, said first bypass means being operable to close upon reaching a predetermined level of pressure at said master cylinder, a second bypass means communicating said master cylinder with said second set of brake cylinders, said second bypass means being operable to close in response to inertia caused by vehicle deceleration, means directing fluid displaced by said second fluid displacing means in opposition to the brake pressure applying movement of said first fluid displacing means, the opposing force of the fluid from said second fluid displacing means being effective to modulate the pressure delivered to said first set of brakes at master cylinder pressures greater than said predetermined level.

References Cited by the Examiner

UNITED STATES PATENTS 2,835,271  5/1958  Oberthur _____ 188—152.11

BENJAMIN HERSH, *Primary Examiner.*

EUGENE G. BOTZ, *Examiner.*

M. S. SALES, *Assistant Examiner.*